United States Patent [19]
Ullman et al.

[11] Patent Number: 5,907,573
[45] Date of Patent: May 25, 1999

[54] NOZZLE FOR PROVIDING UNIFORM EXTRACTION FROM A NON-UNIFORM FLOW

[75] Inventors: Alan Z. Ullman, Northridge; Victor H. Quan, Westlake Village; Arthur H. Bauer, Thousand Oaks, all of Calif.

[73] Assignee: Boeing North American, Inc., Seal Beach, Calif.

[21] Appl. No.: 08/680,397

[22] Filed: Jul. 15, 1996

[51] Int. Cl.$^6$ .................... H01S 3/22; H01S 3/223
[52] U.S. Cl. .................... 372/58; 372/103; 372/701
[58] Field of Search .................... 372/103, 104, 372/55, 59, 50, 58, 701; 422/129

[56] References Cited

U.S. PATENT DOCUMENTS

| | | | |
|---|---|---|---|
| 3,811,095 | 5/1974 | Rich et al. | 372/90 |
| 4,021,753 | 5/1977 | Braunschweig et al. | 372/90 |
| 4,031,485 | 6/1977 | Crane et al. | 372/90 |
| 4,097,820 | 6/1978 | Hill et al. | 372/90 |
| 4,290,031 | 9/1981 | Carroll | 372/90 |
| 4,290,032 | 9/1981 | Vogel et al. | 372/90 |
| 4,307,842 | 12/1981 | Morris | 239/557 |
| 4,457,000 | 6/1984 | Rao | 372/58 |
| 4,483,006 | 11/1984 | Ortwerth et al. | 372/90 |
| 5,658,535 | 8/1997 | Thayer, III | 422/129 |

Primary Examiner—Rodney Bovernick
Assistant Examiner—Robert E. Wise
Attorney, Agent, or Firm—Harry B. Field; Steven E. Kahm

[57] ABSTRACT

A nozzle for mixing of two reacting fluids wherein the first reactant, flowing across the nozzle, exhibits a variation in reactivity towards the second fluid, introduced through the nozzle and mixing and reacting with the first fluid within the nozzle, and wherein the nozzle is configured to permit this second fluid to be introduced in a way as to compensate for the variation in reactivity and to produce uniform reactant mixture from the two fluids.

9 Claims, 2 Drawing Sheets

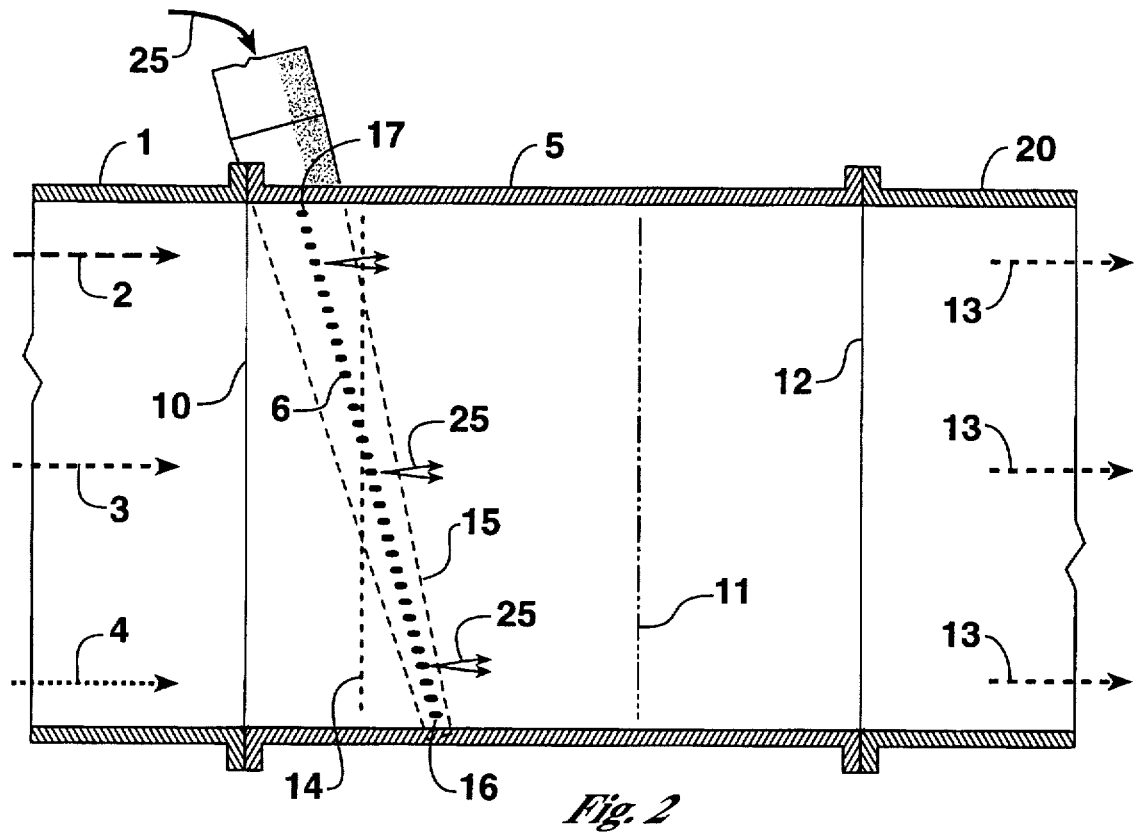
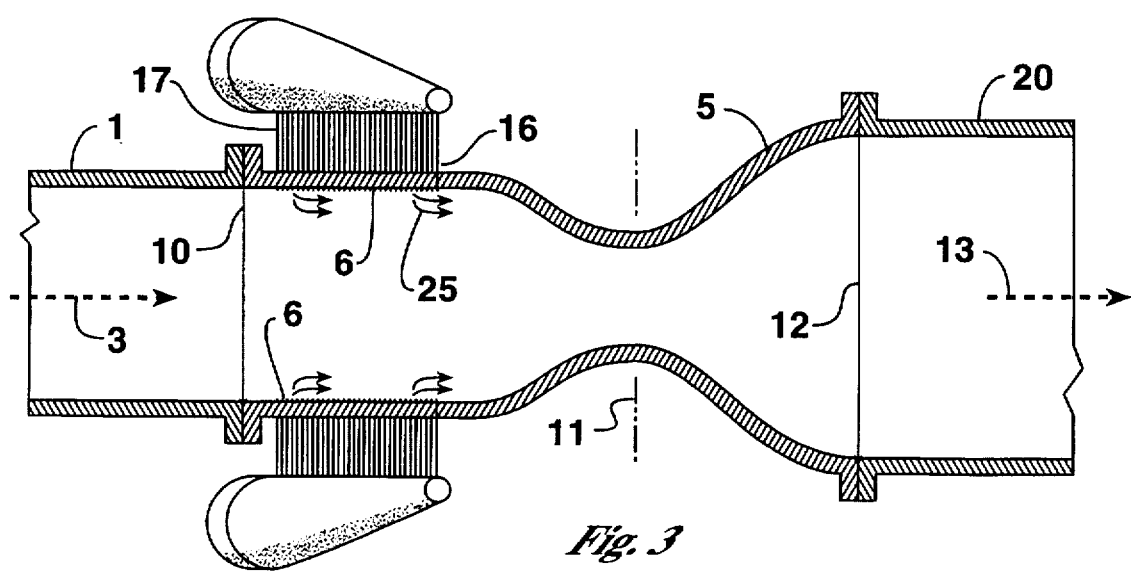

NOZZLE FOR PROVIDING UNIFORM EXTRACTION FROM A NON-UNIFORM FLOW

The government has rights in this invention pursuant to Contract No. F29601-94-C-0050 awarded by the U.S. Department of the Air Force.

BACKGROUND OF THE INVENTION

1. Field of the Invention

This invention relates to nozzles for providing a uniform reagent flow after one of the reactants has traveled variable distances to a chamber, and more particularly to providing a uniformly dissociated iodine flow in a high energy state to a laser cavity where the singlet delta oxygen reactant travels to the iodine injector over a variable distance from the oxygen generator.

2. Description of the Related Art

Chemical oxygen iodine lasers typically perform at optimum efficiency when the dissociation fraction of iodine in the laser cavity is approximately 85%. Either higher or lower dissociation levels result in degraded performance. The oxygen generator produces singlet delta oxygen, $O_2(^1\Delta)$, which is mixed with iodine prior to entering into the laser cavity. Between the iodine mixing point and the laser cavity reactions occur between the $O_2(^1\Delta)$ and the iodine which produce dissociated iodine in a high energy state. The distance provided is selected to achieve the desired level of dissociation at the concentrations and conditions of the mixed streams. For relatively low power chemical oxygen iodine lasers the oxygen generators are relatively small, leading to correspondingly small variations in the concentration and conditions of the $O_2(^1\Delta)$ at the point at which iodine is mixed. For larger devices using larger oxygen generators these variations can be substantial and can impact laser performance.

SUMMARY OF THE INVENTION

The uniformity of iodine dissociation and laser gain in the chemical oxygen iodine laser (COIL) cavity can be enhanced under circumstances in which the $O_2(^1\Delta)$ source is not uniform in concentration and temperature by varying the mixing location and flow rate of the iodine into the $O_2(^1\Delta)$ stream such as to compensate for the variation in iodine dissociation rates caused by the variation in $O_2(^1\Delta)$ source concentration and temperature. In this manner the efficiency of the COIL laser, as well as other desirable characteristics including uniformity of beam intensity and wavefront, may be optimized.

OBJECTS OF THE INVENTION

It is an object of the invention to produce a uniform iodine dissociation fraction in the laser cavity under conditions where the $O_2(^1\Delta)$ source is not uniform.

It is an object of the invention to produce a uniform laser gain in the laser cavity under conditions where the $O_2(^1\Delta)$ source is not uniform.

It is an object of the invention to produce a laser beam with uniform intensity under conditions where the $O_2(^1\Delta)$ source is not uniform.

It is an object of the invention to produce a laser beam with uniform wavefront under conditions where the $O_2(^1\Delta)$ source is not uniform.

It is an object of the invention to optimize the iodine dissociation in the laser cavity such as to optimize the performance of the chemical oxygen iodine laser.

Other objects, advantages and novel features of the present invention will become apparent from the following detailed description of the invention when considered in conjunction with the accompanying drawing.

BRIEF DESCRIPTION OF THE PREFERRED EMBODIMENT

FIG. 2 is a detailed side view of the singlet delta oxygen entering the iodine mixing nozzle and the singlet delta oxygen/iodine mixture exiting the nozzle.

FIG. 3 is a top view of the singlet delta oxygen entering the nozzle and the singlet delta oxygen/iodine mixture exiting the nozzle.

DETAILED DESCRIPTION OF THE PREFERRED EMBODIMENT

Figure 1:
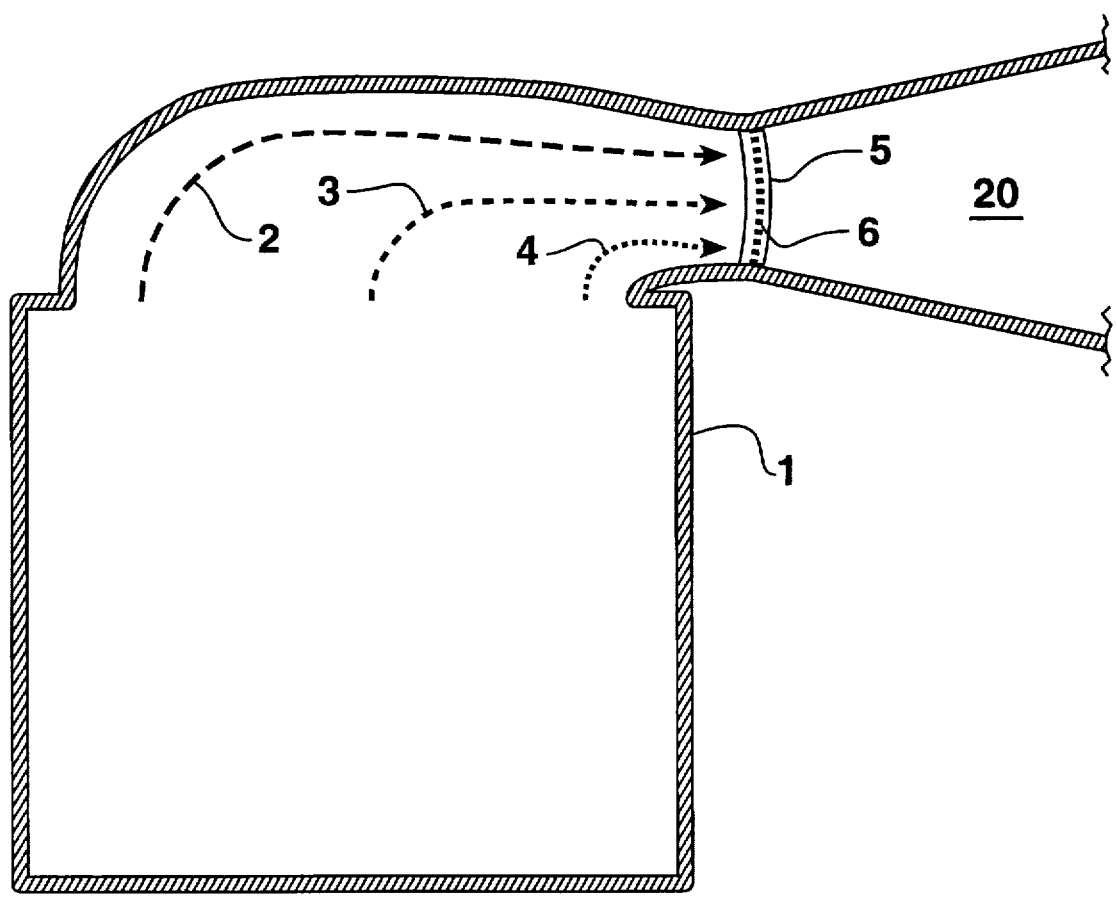
FIG. 1 is a side view of the singlet delta oxygen path flow from the oxygen generator to the iodine mixing nozzle.

FIG. 1 shows typical paths 2, 3 and 4 that the singlet delta oxygen, $O_2(^1\Delta)$ bearing gas stream takes from the oxygen generator 1 to the iodine mixing nozzle 5. Since $O_2(^1\Delta)$ decays exothermically over time, the distance it travels to the iodine input nozzle affects the conditions of the gas stream. When the $O_2(^1\Delta)$ leaves the oxygen generator 1 at the front of the oxygen generator it takes a long path 2 to the iodine input nozzle 5. The long path 2 results in a relatively low yield and high temperature $O_2(^1\Delta)$ stream reaching the iodine mixing nozzle 5. When the $O_2(^1\Delta)$ leaves the oxygen generator 1 in the middle of the oxygen generator it takes a medium path length 3 to the iodine input nozzle 5. This results in a medium yield and medium temperature $O_2(^1\Delta)$ stream reaching the iodine input nozzle 5. When the $O_2(^1\Delta)$ leaves the oxygen generator 1 at the end of the oxygen generator it takes a short path 4 to the iodine input nozzle 5, resulting in a high yield and low temperature $O_2(^1\Delta)$ stream reaching the iodine input nozzle 5.

In the past, as best seen in FIGS. 2 and 3, after the $O_2(^1\Delta)$ flow reached the inlet 10 of the iodine mixing nozzle 5 it passed the iodine injector plate 14 which was normal to the $O_2(^1\Delta)$ flow. The iodine injection orifices 6 were uniformly spaced and had the same diameter or diameters.

The $O_2(^1\Delta)$ and $I_2$ mixture would then pass through nozzle throat 11 and exit at nozzle exit 12 which connects to laser cavity 20 for extracting photons from the iodine to power the chemical oxygen iodine laser. Once the $O_2(^1\Delta)$ and $I_2$ are mixed by introducing flows of iodine 25 through the iodine injection ports 6 the $I_2$ begins to dissociate. It is important for the maximum efficiency of the chemical oxygen iodine laser to have the dissociation level at approximately 85% in the laser cavity 20.

Since the $O_2(^1\Delta)$ paths 2, 3 and 4 from different portions of oxygen generator 1 have different yields and temperatures due to the differing path lengths to the iodine injector plate 14 the iodine injection in nozzle 5 resulted in non-uniform dissociation rates for the mixture as it progressed downstream of the iodine injector plate 14 and entered the laser cavity. This non-uniform rate led to non-uniform dissociation level given equal distance for all stream between the iodine injector plate 14 and the cavity 20, thus lowering the efficiency of the chemical oxygen iodine laser.

The tilted injector plate 15 in nozzle 5 improves the performance of the chemical oxygen iodine laser by making the iodine dissociation more uniform and closer to the 85% maximum efficiency rate. The tilted injector plate 15 is tilted forward at one side of the nozzle as at 17, where it can intercept the longer flow path length 2 of the $O_2(^1\Delta)$ from the oxygen generator 1 sooner. The medium path length 3 is intercepted by the tilted injector plate 15 at about the same position as the normal injector plate 14. The tilted injector plate 15 intercepts the short path flow 4 of the $O_2(^1\Delta)$ further downstream than the normal injector plate 14 on the other side of the nozzle 5 as at point 16. Thus the variable iodine dissociation path from the tilted injector plate 15 to the cavity 20 precisely counterbalances the variations in dissociation rate produced by the compositions and condition variations found typically in streams 2, 3, and 4. In addition or alternatively, the iodine flow rate may be varied along the tilted injector plate 15 by variations in the size or spacing of the iodine injection orifices 6. This will also provide a means of adjusting the rate of dissociation to achieve uniformity at the cavity 20.

The distance of the laser cavity 20 from the iodine injector plate 15 and the speed of the mixture flow through the nozzle are calculated to provide the maximum power for the laser.

The spacing of the iodine injection orifices 6 and the size of the orifices may be varied to maximize the efficiency of mixing the right amount of fluid containing $I_2$ with the $O_2(^1\Delta)$. Since the $O_2(^1\Delta)$ temperature and velocity vary across the iodine injector plate 15 the injector orifices 6 can vary in diameter and spacing to help ensure a uniform penetration, mixing, and dissociation rate for the iodine by the time it reaches the laser cavity 20.

Tilt angles of the tilted injection plate 15 can vary, and the pivot point for tilting the tilted injector plate 15 need not be at the midpoint of the tilted injector plate. Further the tilted injector plate 15 does not have to be straight. It may be curved to fine tune the distances the $O_2(^1\Delta)$ travels and thereby improve the performance of the chemical oxygen iodine laser.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A uniform extraction nozzle for a first fluid flow having a gradient in reaction rates with a second fluid flow, the first and second fluid flows react to provide a mixture flow comprising products of a reaction between the first and second fluid flows for use in a laser cavity, the uniform extraction nozzle comprising:

a nozzle comprising an inlet for receiving the first fluid flow and an outlet that is functionally connected to the laser cavity, and an injector plate comprising injection orifices in the nozzle for injecting the second fluid flow through the injection orifices and into the first fluid flow, the injector plate being tilted relative to a normal to the first fluid flow through the nozzle to compensate for at least one of a gradient in flow times, compositions of the first fluid flow, and conditions in the first fluid flow that result in the gradient in reaction rates between the first and second fluid flows whereby providing a uniform level of products of reaction in the mixture flow at a point of utilization of the products of reaction in the laser cavity.

2. A uniform extraction nozzle as in claim 1 wherein: the injector plate is straight.

3. A uniform extraction nozzle as in claim 1 wherein: the injector plate is curved.

4. A uniform extraction nozzle as in claim 1 wherein: the injection orifices are evenly spaced.

5. A uniform extraction nozzle as in claim 1 wherein: the injection orifices have uniform diameters.

6. A uniform extraction nozzle as in claim 1 wherein: the injection orifices are variably spaced.

7. A uniform extraction nozzle as in claim 1 wherein: the injection orifices have variable diameters.

8. A uniform extraction nozzle as in claim 1 wherein: the first fluid flow is a singlet delta oxygen bearing gas.

9. A uniform extraction nozzle as in claim 1 wherein: the second fluid flow is an iodine bearing gas.

* * * * *